Patented July 16, 1940

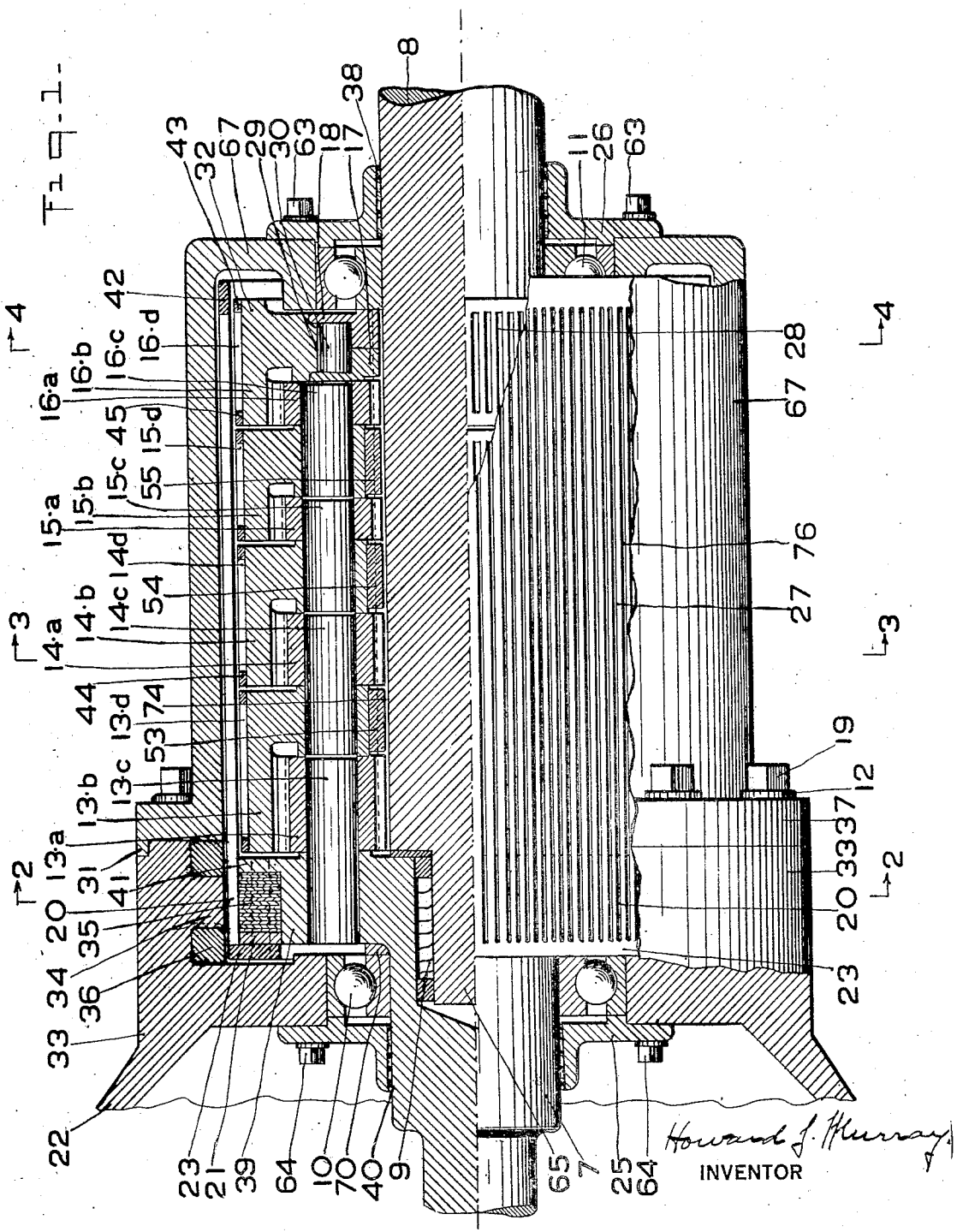

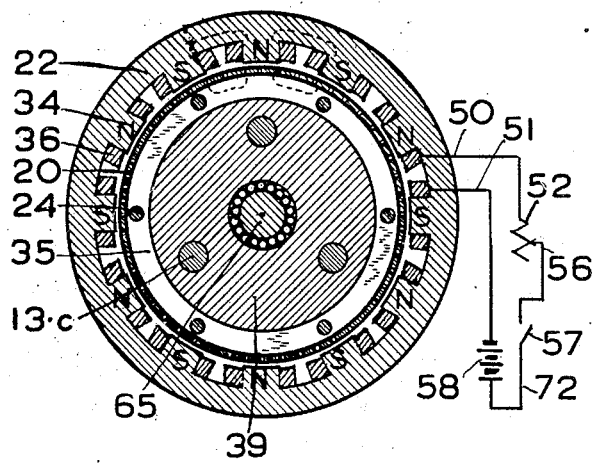
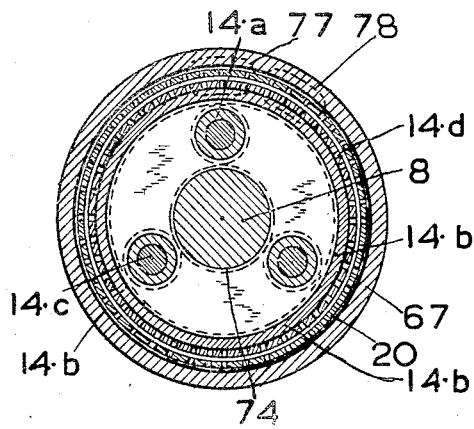
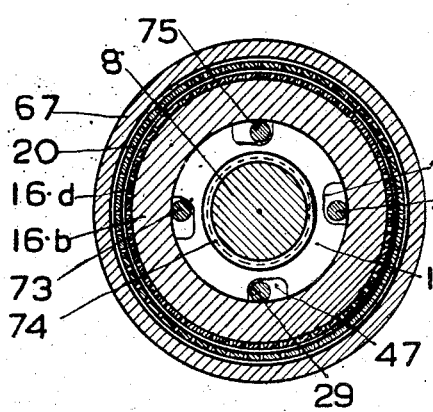
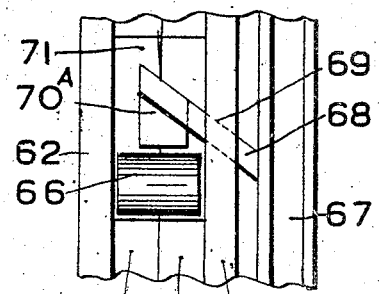
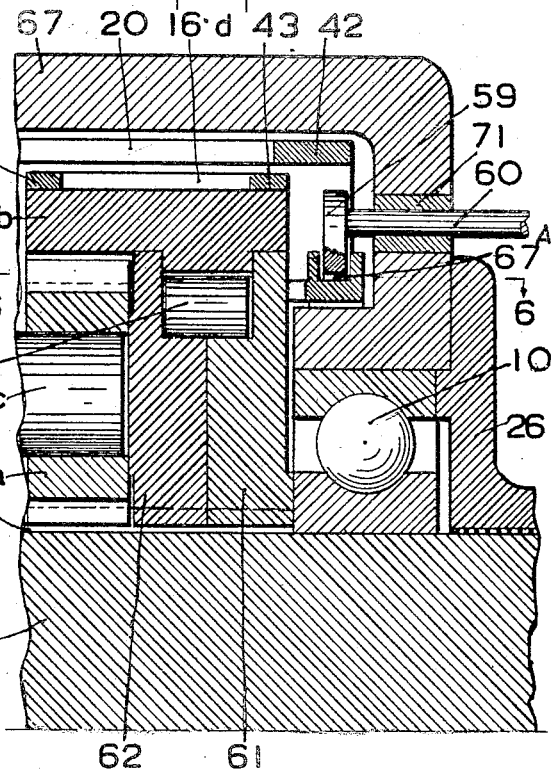

2,208,385

UNITED STATES PATENT OFFICE 2,208,385

AUTOMATIC VARIABLE SPEED POWER TRANSMISSION DEVICE

Howard J. Murray, New York, N. Y.

Application September 20, 1938, Serial No. 230,756

14 Claims. (Cl. 172—239)

My invention relates in general to an automatic electromechanical variable speed power transmission mechanism and specifically relates to a device for effecting and affecting universal speed drive relations between driving and driven members.

One of the objects of the present invention is to provide a form of mechanism arranged so as to utilize a small portion of the power transmitted by the driving member to electrically and mechanically control the speed drive relations of the driving and driven members of the mechanism.

An additional object of the present invention is to provide an amplifying electric control organization normally free of moving contacts in the circuit organization of the mechanism.

A still additional object of the present invention is to provide means including in effect a plurality of dynamo-electric means in concatenanted relation so as to tend to retard certain members of the transmission mechanism including a plurality of interposed drive sets so that the retarding action of the said dynamo-electric means will be in effect both electrically and mechanically amplified to control the relative motions of elements of the interposed sets thereby to cause the transmission of power from the driving member to the driven member during universal speed drive relations.

The present disclosure is a further development of the disclosures of my co-pending U. S. patent applications, Serial Number 23,040 filed May 23, 1935, Patent Number 2,150,983, dated March 21, 1939 entitled "Automatic electric variable speed bidirectional and free-wheeling transmission;" Serial Number 66,876 filed March 3, 1936, Patent Number 2,170,460, dated August 22, 1939 entitled "Variable speed transmission with unidirectional clutch;" Serial Number 75,768 filed April 22, 1936, entitled "Variable speed power transmission device with speed-torque actuated give-away control;" Serial Number 79,825 filed May 15, 1936, entitled "Variable speed power transmission device;" Serial Number 140,150 filed May 1, 1937, entitled "Automatic self-energizing clutch;" Serial Number 143,017 filed May 17, 1937, entitled "Automatic variable speed power transmission device" and Serial Number 200,821 filed April 8, 1938, entitled "Power transmission device."

While the present invention is capable of use in any operation where it is desired to receive control power from a driving member, the present invention is further particularly applicable to coincidently and automatically controlled variable speed power transmission mechanism designed for use in connection with automobile construction, and it is in connection with such use that an embodiment of the invention will be described in detail.

In the drawings:

Figure 1 is one form of physical embodiment of the present disclosure taken axially of the main shafts.

Figure 2 is a transverse sectional elevation taken approximately upon the line 2—2 of Figure 1 looking in the direction indicated by the arrows.

Figure 3 is a transverse sectional elevation taken approximately on the line 3—3 of Figure 1 looking in the direction indicated by the arrows.

Figure 4 is a transverse sectional elevation taken approximately on the line 4—4 of Figure 1 looking in the direction indicated by the arrows.

Figure 5 is a partial sectional elevation taken axially to indicate a modification of the means of Figure 1.

Figure 6 is a partial sectional view of the means of Figure 5 taken approximately upon the line 6—6 looking in the direction indicated by the arrows.

In the following description and in the claims, parts will be identified by specific names for convenience of expression, but they are intended to be as generic in their application to similar parts as the art will permit.

There is shown in the drawings a novel dynamo-electric control organization and associated mechanical power transmission elements constituting a variable speed transmission and including a pair of shafts 7 and 8 disposed in axial alignment with their adjacent ends interfitted so as to provide proper space for the bearing element 9. These power shafts are mounted for independent rotary movement respectively in suitable bearings 10 and 11 positioned and supported in the transmission casings 22 and 67 by the flanged members 25. While either of these power shafts 7 and 8 may be considered as the driving or driven member of the transmission mechanism, for the purpose of this description it will be understood that the shaft 7 is the normal driving shaft, and is operatively connected to be driven from the source of power such as an internal combustion engine or other suitable mover (not shown).

Accordingly, shaft 8 is regarded as the normally driven shaft, and is operatively connected to whatever mechanism (not shown) it is desired to drive. The shaft 8 is preferably formed with a plurality of teeth 74 so as to operatively receive a plurality of groups of toothed planet and annular gears forming together with the teeth 74 a plurality of differential speed sets all connected in operative relation with the driving member 7 and the driven member 8 as hereinafter described.

The planet gears 13—a, 14—a, 15—a and 16—a are separately supported by the shafts 13—c, 14—c, 15—c and 16—c so as to be constantly in mesh with the teeth 74 and the teeth of annular gears 13—b, 14—b, 15—b and 16—b. Unless otherwise specified, the gears and shafts as shown in Figure 1 are preferably made of a good quality of steel, and the casings 22 and 67 are made of material suitable for magnetic flux paths.

The annular gears 13—b, 14—b, 15—b and 16—b are positioned and supported by the toothed bearing members 53, 54 and 55. These annular gears are formed to receive the bearing shafts 14—c, 15—c and 16—c and are constantly in mesh with the planet gears 13—a, 14—b, 15—b and 16—b. The annular gear 16—b is mounted for rotation on the split toothed bearing members 17 and 18 also formed to receive the clutch roller member 30 as shown on Figure 4.

With this arrangement, it is evident that the planet gear 13—a is constantly in mesh with the sun teeth 74 of the normally driven member 8 and the teeth of the annular gear 13—b. Planet gear 14—a is constantly in mesh with the sun teeth 74 and the annular gear 14—b. Planet gear 15—a is constantly in mesh with the sun teeth 74 and the annular gear 15—b, and planet gear 16—a is constantly in mesh with the sun teeth 74 and the annular gear 16—b.

In passing, it should be noted that the sun teeth 74 forming portions of the normally driven shaft 8 are in reality portions of the interposed differential gear sets.

With this arrangement, it is obvious that power may be transmitted by and between the power members 7 and 8 through a plurality of progressively divisible power paths in effect in series parallel relation, and that each of these power paths may be employed to transmit power according to the degree of retardation of the annular gears 13—b, 14—b, 15—b and 16—b as hereinafter described.

Any retardation applied to the annular gear 16—b will be transmitted to the other annular gears 15—b, 14—b and 13—b, and that additional interposed gear sets may be added without departing from the spirit of the invention.

Inspection will show many paths through these gears of Figure 1 are provided for the transmission of power from one of the members 7 and 8 to the other. All of the gear elements of the said paths are drive associated, and any change in the drive status of one path portion will be transmitted to other path portions in accordance with the arrangement of the gear sets including the said portions. The speed relations of all the gears and set elements of Figure 1 are fixed for any given drive relation between the members 7 and 8 because the gears of the sets are constantly in mesh.

Each of the said annular gears is provided with an armature winding including inductor portions. Thus annular gear 13—b is provided with inductors 13—d. Gear 14—b with inductors 14—d. Gear 15—b with inductors 15—d and gear 16—b with inductors 16—d. The inductors of each annular gear are connected to end rings in the conventional manner well known to those skilled in the electrical art. Thus inductors 16—d are connected to end rings 43 and 45.

The speed of an inductor portion of any of the annular gears is a function of the speed relations of all the annular gears, and conversely the speed relations of the said annular gears may be determined by the speed of an inductor portion. Any change in the relation (speed) of an inductor portion will necessarily cause a change in the speed driving relations of the members 7 and 8. If the said inductor portion is in effect retarded, it is obvious that the differential relations of the gears of Figure 1 will necessarily be changed.

The inductor portions may be formed of copper moulded in cut-away portions of the annular gears, although it is obvious that it would not be departing from the spirit of the invention to form the armature portions of the said annular gears in any known and acceptable manner.

The normally driving member 7 is formed with a radially extending flanged portion 39 provided with openings to receive the bearing shafts 13—c. The portion 39 is cut away to form the end projection 41. A plurality of laminations 35 are positioned on the portion 39 after which a combined field producing and armature member 20 is securely fastened to the portion 39 by means of the bolts 24 for rotation therewith as shown in Figure 2.

The member 20 is preferably made of a low resistance material such as copper or aluminum and includes two end ring portions 23 and 42. Thus the member 20 is formed of a plurality of parallel portions 27 constituting both inductors and conductors symmetrically positioned about a common axis so as to collectively form a cylindrical member. The openings 76 may be filled with an insulating medium such as Bakelite.

The casing portion 22 is formed with a bell housing extension and arranged to receive the field windings 36 as shown in Figure 2. The windings are connected to a source of current 58 (see Fig. 2) through the variable resistance 52 as hereinafter described. The member 20 is normally positioned to rotate between the drive set inductors 13—d, 14—d, 15—d and 16—d and the transmission casing on the right hand end and between the armature laminations 35 and the pole-pieces 34 on the other end. The annular gears 13—b, 14—b, 15—b and 16—b and the casing portion 67 also constitute portions of flux paths for the flux created by the current flowing in the parallel portions of the member 20 as shown by the dotted lines of Figures 3 and 4.

The casing portions 22 and 67 are securely attached to each other by means of the bolts 19 and washers 12, and the portion 22 is securely attached to the vehicle engine by means of bolts (not shown).

In operation, let it be assumed that the source of vehicle power is connected to the normally driving shaft 7 by means of any conventional vehicle clutch means such as is commonly found on automotive vehicles, altho it is possible to operate a vehicle according to the present disclosure without any clutch member between the source of power and the transmission mechanism. It is also understood that any suitable drive reversing unit may be installed in the power transmission line, preferably between the driven member 8 and the rear axle of the vehicle.

Let it be further assumed for the purpose of this description that the source of vehicle power (not shown) connected to the normally driving member 7 will normally rotate the same clockwise as viewed from the left hand end of Figure 1. The device to be operated and driven, such as an automotive vehicle is assumed to be connected to the driven shaft 8, and the field winding 36 de-energized.

In this event the planet gears 13—a, 14—a, 15—a and 16—a will rotate about the shafts 13—c, 14—c, 15—c and 16—c as they revolve about the still shaft 8 due to the meshing action of same with the still teeth 74 of the said driven shaft.

Normally, more teeth are provided on the annular gears 13—b, 14—b, 15—b and 16—b than are formed as sun teeth 74 on the normally driven shaft 8. Consequently, as the teeth are still, it is evident that the annular gear 13—b will be rotated about the shaft 8 at a faster speed than the planet gears 13—a are revolved about the shaft 8 by the shaft 7. This increase of speed of the annular gear 13—b over the speed of the normally driving member 7 will be hereinafter described as the advancing ratio between adjacent differential speed sets. The actual advancing ratio will, of course, be determined by the design of the said drive sets. It is evident there is a wide range of advancing or decreasing ratios, and that the ratio may change with the design of each individual set.

This differential action may be more clearly understood by reference to Figure 3 of the drawings. The planet gears 14—a are shown mounted for rotation on the shafts 14—c fixed in the adjacent annular gear 13b, and the annular gear 14—b is shown as constantly in mesh with the planet gears 14—a. In a similar manner the annular gears 13—b, 15—b and 16—b are in mesh with the planet gears 13—a, 15—a and 16—a and the teeth 74 of the member 8.

Still further consideration of the arrangement of Figure 1 will show that an increase in the advancing ratio of the annular gears by the planet gears will collectively cause a comparatively large increase in the speed of the annular gear 16—b.

Thus, according to the present disclosure, it is possible to provide means whereby the inductor portion 13—d will rotate clockwise about the axis of the member 8 (member 8 is assumed to be at rest at this time) at a faster speed than that of the driving member 7. That inductor portion 14d will rotate clock-wise at a faster speed than inductor portion 13—d. That inductor portion 15—d will rotate faster clock-wise than the inductor portion 14—d, and finally that inductor portion 16—d will rotate clock-wise faster than the portion 15d.

The combination field producing and armature member 20 is attached to the normally driving member 7 to rotate clock-wise therewith. Thus the inductor portions 13—d, 14—d, 15—d and 16—d (with member 8 at rest) will all rotate clock-wise faster than the member 20, and the annular gear inductor portions are all rotating at different speeds depending on the design of the said differential speed sets.

Now let it be assumed that it is desired to move the mechanism to which the normally driven member 8 is connected through the said conventional reversing unit. In this event, the operator of the vehicle closes the switch 57 (see Figure 2), and it is suggested that this field control switch is coincidently operated with the conventional ignition switch as commonly found on automotive vehicles.

When the wiper 56 is moved over the variable resistance 52 varying current will be conducted to the field windings 36 through the closed circuit including leads 72, 50 and 51. It is further suggested that the wiper 56 be coincidently actuated with the conventional fuel control throttle as commonly found on automobile vehicles, and as shown in several of my co-pending applications listed herein.

The field producing current flowing in the field producing windings 36 will produce magnetic flux. This flux will exist in the flux path formed by the pole-pieces 34, casing 33, laminations 35, member 20 and the air-gaps existing between said members.

Normally as the fuel supply is increased in the conventional manner, the strength of the field producing current in the field windings 36 will increase or decrease according to the manner in which the device is installed and operated. Let it be assumed for the purpose of this description that the current will increase with increase of fuel supply. With the member 7 rotating (say) at constant speed, the member 20 will also rotate at constant speed and will cut the flux created by the current flowing in the windings 36, and thus an E. M. F. and a resulting current will be produced in the parallel conductors and inductors 27. Current induced in the inductors 27 while passing under an S pole (see Figure 2) will flow opposite to the current induced in the said inductors while passing under an N pole. These currents will flow through a closed circuit formed in the combination member 20 by the inductors 27 and the end rings 23 and 42 as is well known in the electrical art.

While the individual current induced in one of the inductor portions 27 is an alternating current, it is obvious that the sum of all the currents induced under one pole is approximately a constant for a given set of dynamo-electric conditions. Some of the said individual currents are increasing as others are decreasing, but currents induced under opposite adjacent poles will add and flow in effect as a unidirectional current. The induced current will create a flux in the flux path formed by the casing portion 67, inductors 13—d, 14—d, 15—d and 16—d, portions of the annular gears and the air gaps between these portions.

Disregarding armature reactions and other minor factors which are present in all dynamo-electric mechanisms under operation, the field produced by the current flowing in the inductor portions of the combination member 20 will be in effect unidirectional and stationary. This is true, because the current induced in the inductor portions of the member 20 is in effect unidirectional and stationary without regard to the actual speed of the member 20. The E. M. F. of the induced currents will depend on the speed of the member 20 and the strength of the field produced by winding 36. The power required to induce the currents in the inductor portions of member 20 is derived from the normally driving member 7, and thus the flux created by these induced currents is also derived by power from the said driving member 7.

This novel dynamo-electric arrangement permits the creation of a large strong magnetic field with a comparatively small current taken from the vehicle battery 50, and also eliminates the necessity of slip-rings or commutating elements to conduct current for field creating purposes to the portions of the member 20. For example, with proper design the flux created by the current in the member 20 may be increased many times with the same amount of current taken from the vehicle battery. Further, the inductors of the means of Figure 1 may be made of magnetic material if desired, thus decreasing the reluctivity of the magnetic paths. No extra bearings are required for the dynamo-electric elements of this mechanism insofar as the modification shown by Figure 1 is concerned.

The inductors 13—d, 14—d, 15—d and 16—d will thus be rotated to cut the substantially stationary and unidirection flux produced by the induced current in the inductors of member 20, and thus current will be separately induced in the sets of inductors 13—d, 14—d, 15—d and 16—d and the associated annular gears 13—b, 14—b, 15—b and 16—b will be retarded in their clock-wise rotation according to the extent of such current induction. The flux created in the inductors of the member 20 will be arranged in effect in a similar manner as the flux created in the windings 36 with the same number of poles and the same angular relation. The power required for the induction of current in the armature inductors 13—d, 14—d, 15—d and 16—d will be derived from the driving member 7.

The accompanying braking effect encountered in inducing current in the drive set armature inductors will act to tend to slow down or retard the clock-wise rotation of the annular gears 13—b, 14—b, 15—b and 16—b. This reaction will be imparted to the planet gears 13—a, 14—a, 15—a and 16—a constantly in mesh with the said planet gears and a collective clock-wise driving force will now be imparted to the teeth 74 of the normally driven shaft 8 by the planet gears 13—a, 14—a, 15—a and 16—a in order to tend to maintain the differential relation of all the gears shown in Fig. 1. If this combined reaction is sufficient to overcome the load resistance of the member 8, then the said member 8 will be rotated clock-wise. If not sufficient, the field (and coincidentally the field strength created in the windings 36) current and the fuel supply and thus the speed of the driving member 7 may be increased by the operator to increase the said reaction sufficiently to overcome the said load resistance so as to rotate the driving member 8.

If the fuel supply pedal (not shown) is connected to coincidentally move the wiper 50 across the variable resistance 52 as the fuel supply to the vehicle source of power is increased, it is obvious that the strength of the field current supplied to the winding 36 may be varied as a coincidental function of the said control. Thus the drag on the annular gear inductors 13—d, 14—d, 15—d and 16—d may be varied as a coincidental function of the fuel supply to the vehicle. In either event, the reaction of the planet gears may be made greater than the resistance of the normally driven member 8, and thus the member 8 will be rotated.

As the drag on the inductors 13—d, 14—d, 15—d and 16—d is increased, or the torque resistance of the member 8 is decreased the speed of the said member 8 will normally increase. In actual operation, all sorts of speed relations will occur and in addition the load resistance of the member 8 will be varied by the variations of the vehicle path. For the purpose of this description, let it be assumed that the constant speed of the normally driving member 7 is continued. In this event, over a level path, the resistance of the vehicle will decrease as the speed of the said vehicle increases. The inductors 13—d, 14—d, 15—d and 16—d will be more easily retarded and the clock-wise speed of the annular gears will decrease to maintain the differential relation of the means of Figure 1.

As the clock-wise speed of the normally driven member 8 approaches the speed of the normally driving member 7, the clock-wise speeds of all the annular gears will also approach the speed of the driving member 7. When the members 7 and 8 finally rotate at the same speed, all the rotating parts of the power transmitting mechanism of Figure 1 rotate together with no relative motion between them. This is an ideal condition. This condition of no relative movement between rotating parts during direct drive intervals is equivalent to an integral member interposed between the members 7 and 8, and insures high efficiency and the elimination of wear during a large percentage of the operating time. In conventional transmissions there is always present the rotating parts of the conventional countershaft.

Thus during direct drive speed relations of the members 7 and 8, the inductor portions 13—d, 14—d, 15—d and 16—d and therethrough the annular gears 13—b, 14—b, 15—b and 13—b have been varied in their clock-wise rotation until they are rotating at the same speed as the members 7 and 8.

The power derived from the driving member 7 to retard the annular gears is nearly all returned to the driven member 8 through the reactions of the differential gears of Figure 1. For any speed driving relation between the members 7 and 8, all of the control power derived from the member 7 is returned to the member 8 except that lost by friction and dynamo-electrically as C2R and eddy currents. Thus according to the present disclosure, variable speed drive relations may automatically be effected between the member 7 and 8 at high efficiency.

As the C2R loss varies as the square of the current and directly as the resistance, any design directed toward decrease of current (even with increase of resistance) will increase the efficiency of the mechanism.

With the normally driving member 7 driving the shaft 8 (say at the same speed for the purpose of this description) through the plurality of power paths hereinbefore described, the actual transmitting relation of these paths will be considered. The actual division of power through these paths may of course be accurately determined by investigation for a given design: For the purpose of this description, let it be assumed that about equal torque is impressed by the planet gear 13—b to the annular gear 13—a and the sun teeth 74 of the member 8. Thus a large percentage of the power received from the driving member 7 is transmitted to the sun teeth 74 and the shaft 8 by the gear 13—a. The remainder of the power is transmitted to the shaft 14—c and thus to the planet gear 14—b and again divided between the annular gear 14—b and the teeth 74 of the member 8. In the same manner, power is progressively divided by all the planet gears, and the final power path division is formed in the annular gear 16—b.

With each of these divisions, the power required to retard the annular gears decreases. It will take less power to retard the gear 14—b to cause the same reaction on the teeth 74 than will be required for the gears 13—b. Less power for gears 15—b than for gear 14—b and so on. As the number of sets is increased, the control power required to rotate the member 8 is decreased, or the control effort of the same amount of power is amplified. Thus the same amount of power applied to the inductors of the gear 16—b will have greater control than when applied to the inductors of the gear 13—b.

For example, it is impossible to so design the mechanism of Figure 1 that only approximately 6 percent of the total power from the driving member 7 will be required to act through the dynamo-electric means and the speed sets to thereby control the speed-torque ratio of all the power transmitted. If more differential sets are added to the showing of Figure 1 the percentage of control power will decrease with each additional set. Each set added will require less holding action in its inductors to perform its share of the control action.

Theoretically the last set axially, such as the set including annular gear 16—b and its associated inductors 16—d is the most efficient set for the holding action required. In fact, if the last set axially is used alone, and without inductors on the other sets, the most efficient action will be obtained. However, according to the present disclosure, inductors portions are shown with all the sets in order to obtain control action during overspeed and reverse power operation as hereinafter described.

If the vehicle upon which the device is installed and operated is moving along a level path, the torque required to drive the member 8 will normally decrease as its speed increases. If the set control action or reaction is more than that required for direct drive conditions, the holding action on the annular gears will tend to accelerate the normally driven member 8 to an overspeed relation with the driving member 7 and the clock-wise speed of the annular gears will be still further retarded. The clock-wise speed of annular gear 16—b will be retarded to the greatest extent. Gear 16—b will be reduced to a greater extent than gear 15—b, 15—b more than 14—b and so on. In order to maintain the differential driving relations of the gears of Figure 1, it is evident that the speed of the member 7 will be less than the speed of the member 8 and a condition of overspeed drive will be effected in the transmission and the normally driven member 8 will be rotating faster than the normally driving member 7.

With continued retardation of the said annular gear inductor portions, the speed of the annular gear 16—b will approach zero and the flux cutting action will decrease. The speed of the other annular gears 13—b, 14—b and 15—b will also decrease according to the differential relations of the gears of Figure 1. Because of the advancing ratio and the resultant speed, the inductors 16—d have greater control effect when annular gear 16—b is rotating clock-wise faster than the normally driving member 7. When over-speed drive conditions exist, inductor portions 16—d are rotating clock-wise slower than the other set inductors and therefore has less flux cutting action than the other said inductors 15—d, 14—d and 13—d. In fact inductors 13—d have the greatest control action as the inductors 16—d approach zero under over-speed drive conditions. With all the other inductors 13—d, 14—d and 15—d eliminated from the means of Figure 1, the degree of over-speed is automatically limited because a speed will be reached wherein the flux cutting action will not be sufficient to maintain a proper retarding action on the inductors 16—d and thus the overspeed action cannot be increased unless the flux density is increased. When inductors 13—d, 14—d and 15—d are present they are still being forced through the flux of the induced current in the member 20, and therefore due to their higher speeds collectively act to widen the degree of overspeed drive. This action is true, because while the torque of driven member 8 has normally decreased, the speed of inductors 13—d has been only slightly decreased relatively. The retarding or control action of inductors 13—d varies less than that of any of the other set inductors, because their speed varies less.

Now let it be assumed that the vehicle has reached a down grade portion of its path of movement. At first the member 8 will continue to be rotated with overspeed relations by the driving member 7, and finally reach no torque drive relation. Gear 16—b will quickly reach zero speed and thence reverse to rotate counter-clock-wise. Approximately free-wheeling will exist as the gear 16—b reverses, but member 8 will eventually become the driving member. Normally the driving member will speed up because the load has been reduced, but let it be assumed for the purpose of this description that the member 7 continues to rotate at constant speed. The gears 13—b, 14—b and 15—b are still rotating clock-wise. The vehicle will normally increase in speed, and thus the member 8 will increase in speed. The annular gears 15—b, 14—b and 13—b will reach zero speed and reverse one after the other to rotate counter-clock-wise. The inductors 13—d, 14—d, 15—d and 16—d will all cut the flux created by the current flowing in member 20. The gears 13—b, 14—b, 15—b and 16—b will be retarded to react against the teeth 74 to cause the member 8 to drive the normally driven member 7 against compression. Ordinarily the operator will decrease the fuel supply, and the speed of the member 7 will decrease. It is contemplated, according to the present disclosure that the wiper will remain in contact with the variable resistance 52 even when the operator's foot is removed from the gas pedal (not shown). If the operator does not wish compression driving, he will keep the speed of the member 7 to a point of approximate free-wheeling, altho the members 7 and 8 remain at all times in drive relation. Of course, the driving relations of the members 7 and 8 are constantly changing during the actual operation of a vehicle. The operation described above may be considered as taking place for results normally obtained for a constant speed of the driving member 7 and a constant field current. By varying the field current, many variations of the operating relations described may be obtained. The normally driven member 8 will never drive the member 7 equal to or faster than its own speed according to the arrangement of Figure 1, but will drive the member 7 at some speed less than its own speed. As the speed of the normally driven member 8 continues to increase beyond the speed of the member 7, all of the inductor portions 13—d, 14—d, 15—d and 16—d will be increased in a counter-clock-wise direction to the condition wherein the flux cutting and thus the retardation of the annular gears in their counter-clock-wise rotation will react on the teeth 74 of the member 8, and thus cause the member 8 to drive the member 7 against compression. Compression driving may also be varied by varying the field. This is true, because varying the field winding current in elements 30 will vary the intensity of the field flux. Varying the intensity of the said flux will vary the flux cutting action and thereby the magnitude of the currents induced in the set inductors and this will vary the holding or retarding action and thus the driving relations of the members 7 and 8.

If it is desired to employ compression braking or retardation under conditions wherein member 7 is driven at the speed of the member 8, then the clutch roller member 30 may be installed in the arrangement of Figure 1. This more or less conventional member 30 may be arranged to operate automatically as shown in Figures 1 and 4 so that whenever the annular gear 16—b rotates slower than the bearing members 17 and 18 and therethrough the member 8, the roller 30 will be automatically moved into a clutching relation with the annular gear 16—b and the bearing members 17 and 18. In other words, wherever the annular gear rotates clock-wise faster than the member 8 it will be free of the said member, and whenever it decelerates to the speed of member 8 the roller will connect it in positive driving relation with the member 8. Hence, whenever the driving member is driven by the member 8, the rollers 30 will automatically be moved in the spaces 47 and 49 of Figure 4 and into positive clutching position to permit the member 8 to positively drive the member 7 in direct drive relation, and to normally remain inactive when the member 7 is driving the member 8.

In this event, the vehicle will move down grade with the vehicle driving the engine directly as is usual with most conventional vehicles. This action may be objectionable to some operators who coast down grade and thus save fuel and engine wear. Accordingly, the present disclosure provides means permitting the operator to selectively control the operation of the roller clutch member 30. Means are shown in the modification of Figure 5 permitting the operator to remotely and coincidently control the clutching action of the roller 30 so that the operator may coast or free-wheel and thence employ compression driving to aid in braking or as a safety operation when desired.

In Figure 5 there is shown a reciprocating rod 60 equipped with a shift finger 68 riding in the shift finger slot 67—A (see Figure 6.) This shift finger slot member is connected to a plurality of obliquely positioned cammed arms 68 moving in camming slots 69 and supporting a plurality of barrier elements 70—A normally holding the clutch rollers 66 in a normally inactive position. The rod 60 is connected to the brake control lever (not shown) so as to be coincidently actuated therewith. Thus when the vehicle brake control mechanism is operated to set the brakes (not shown) the rod 60 will be moved to the left (referred to Figure 5) to move the arms 68 to the left in the cammed openings 69 thereby to move the barriers 70—A away from the rollers 66 so that the rollers 66 may be moved by the clutching surface of the annular gear 16—b into clutching relation with the gear and the bearing portions 61 and 62 so that one may drive the other through the said rollers 66.

Thus the release of the clutch rollers from an inoperative position will become a function of the operation of the vehicle brake control mechanism. The rollers will connect the members in direct positive drive relation without any action or attention on the part of the operator. If, for any reason the brakes become inoperative, the operator at least will have the protection of direct drive compression braking. When the brake pedal is released, the brake control spring will act to move the rod 60 to the right and thus return the barriers to the position shown in Figure 6. In case the spring action is not sufficient to release, the first touch on the gas pedal for resuming driving action by the member 7 will release the said rollers.

The conventional reverse speed drive unit hereinbefore mentioned may be provided with positive speed changing elements so that the actual speed driving relations of the engine and rear axle may be other than direct drive, even though the members 7 and 8 are in direct drive relation.

In operating the drive control mechanism provided by the present disclosure, it is therefore possible to start with the vehicle at rest and with the engine running. With the vehicle clutch "in" and the shaft 7 rotating, the speed of the driven shaft may be brought up to the speed of the shaft 7 and thence into overspeed relations. The overspeed relation will occur automatically, as will all the other speed driving relations without any action or attention on the part of the operator. Or the speed relations may be varied by the operator as a coincidental function of the normal operation of the vehicle.

While I have shown and described and have pointed out in the annexed claims certain novel features of my invention, it will be understood that certain well known mechanical and electrical equivalents of the elements illustrated may be used, and that various other substitutions, omissions and changes in the form and details of the device illustrated and in its operation may be made by those skilled in the electrical and mechanical art without departing from the spirit of the invention which is indicated in the following claims. For example, there is shown by Figures 5 and 6 a novel means for connecting the normally driving member and the normally driven member in positive drive relation. This means is directed to the co-incidental operation of the vehicle brakes and the selective unidirectional clutch mechanism shown in Figures 5 and 6. It is obvious in the light of this disclosure that the vehicle brakes could also be co-incidentally operated by the conventional emergency brake lever with a duplicate unidirectional clutch mechanism (or a combined bidirectional clutch mechanism) so that the vehicle wheels would be positively connected with the vehicle engine in case of any undesired movement of the vehicle.

Having thus described my invention, I claim:

1. A casing enclosed power transmission device for associating a driving member and a driven member mounted for rotation about a common axis in speed drive relations, comprising differential speed sets each formed with an armature portion and each connected to the driven member and to adjacent sets, one set connected to the driving member, a source of current, a dynamo-electric couple including a fixed field producing portion variably energized from the said source and attached to the said casing and an armature portion mounted for rotation with the driving member, and further field producing means formed integral with the said couple armature, said further means energized by current induced in the couple armature and operatively associated with the set armature portions to cause said relations.

2. An electro-mechanical torque amplifying device for automatically affecting and effecting the speed drive relations of vehicle driving and driven members, including speed drive units axially disposed between said members, an end unit connected to one member and all units connected to each adjacent unit and the other member, a casing, a source of power, a dynamo-electric machine couple including a fixed field producing element fastened to the casing and an armature portion mounted for rotation with the driving member, said dynamo-electro means including a movable field producing element formed integral with the couple armature and energized by current induced in the said armature when rotated, a plurality of armature portions dynamo-electrically related to the said movable field element and mounted for rotation with the speed units, said casing formed with portions constituting flux path portions for the flux produced by both field producing elements.

3. An enclosed variable speed power transmission device for associating driving and driven power members, including speed sets interposed between said members, said sets each formed with elements constituting an armature and each set connected to the driven member and to adjacent sets, one set connected to the driving member, a source of current, a dynamo-electric machine couple including a fixed field producing element energized from said source and attached to the enclosure and an armature portion mounted for rotation with the driving member, said armature portion of the said couple forming a further field producing means when energized by the currents induced in the said armature portion as same is rotated by the said driving member, said further field producing means magnetically associated with all the set armatures, and a unidirectional roller clutch mechanism positioned between said members.

4. A torque amplifying device for affecting the speed driving relations of driving and driven members of a power vehicle provided with braking and fuel supply means, including speed driving units axially displaced between said members and each provided with elements constituting an armature, and an end unit connected to one member and all units connected to adjacent units and the other member, a dynamo-electric machine couple including a fixed field producing element and an associated armature element forming a portion of the said driving member, said associated armature element of the said couple forming a second field producing means when energized by the current induced in said armature element as same is rotated by the said driving member, said second field producing means dynamo-electrically associated with all the unit armatures, a source of current, and a plurality of circuit control means connected to the source and the fixed field and operatively associated with the said vehicle brake and fuel supply means for coincidently varying the flux producing action of the couple field element as separate coincidental functions of the operation of the braking means or the fuel supply during the operation of the vehicle.

5. The combination in a vehicle power transmission mechanism including a pair of shafts, differential speed driving sets each provided with an armature portion and in speed driving relation with one of the shafts and with each neighboring set, one set in driving relation with the other shaft for establishing a drive between the shafts, of control means including a source of current for automatically establishing a desired speed relation between the shafts as the drive is effected, said control comprising a dynamo-electric machine exciter couple including a fixed field producing portion energized from the said source and a rotatable armature element carried by the driving shaft, said exciter armature element of the control means forming a second field producing means rotatable with the driving shaft and energized by the current induced in the exciter armature element when rotated, said second field means dynamo-electrically associated with each of the said set armatures, and a plurality of manually operable coincidental vehicle fuel supply and brake control means actuated circuit elements for separately controlling the current supply to the exciter field element to cause same to be variably effective, said control means being operable incidental to the rotation of the shafts in addition to the control action of the fixed field producing means.

6. A variable speed power transmission mechanism including a driving member and a driven member of a vehicle equipped with brake and power supply control means, a control amplifying resistant organization positioned between said members, said resistant organization including an exciter dynamo-electric means with a fixed field producing element and an associated armature element mounted for rotation with the driving member for initiating the said control action, a second field producing element mounted integral with the exciter armature for rotation with the driving member, and a plurality of differential gear sets each provided with an armature portion electro-dynamically associated with the second field element for amplifying the control effect of the said exciter power when initiated, said sets arranged in a series multiple relation so as to provide series multiple power paths for the transmission of power between the said members, each set connected to the driven member and to adjacent sets, one set connected to the driving member, a source of current, and circuit means coincidently associated with the brake and power supply control means for supplying field current to the exciter initiating means for dynamo-electrically associating the initiating means with the driving member armature so as to act to derive the control power to be amplified by the sets from said driving member thereby to affect and effect the transmission of power from one member to the other as a function of the selective operation of the brake and power supply controls during the operation of the vehicle.

7. An electro-mechanical control amplifying device for connecting a vehicle driving member and a vehicle driven member in speed drive relations, including gear sets each provided with armature elements and arranged so as to provide progressively divisible power paths between said members, a dynamo-electric control initiating couple including a fixed field producing element and an armature element mounted for rotation with the driven member, further field producing means mounted integral with the couple armature for rotation with the driving member and energized by current induced in the said initiating couple armature, said further field means operatively associated with all the set armatures so as to cause the device to derive control power from the driving member according to the extent of the said path division, a source of external current, and adjustable circuit means connected to the source and the initiating field element for additionally varying the intensity of the field and thereby the said control power derivation according to the adjustment of same.

8. A control amplifying organization for associating a driving member with a driven member of a vehicle equipped with brake and power supply control means, comprising differential drive sets axially disposed between the said members and each formed to receive and carry inductive armature elements, a dynamo-electric exciter couple including a stationary field producing member and an armature member arranged for rotation with the driving member, a source of field current, a plurality of circuit elements arranged for controlling the supply of current to the exciter field member from said source and coincidently associated with the brake and power supply control means for coincidently varying the strength of the said exciter couple field and thereby the effect of the said field on its associated armature, a second field producing member formed integral with the exciter armature and also mounted for rotation with the driving member and energized by current induced in the exciter armature member to thereby cause each of the set armatures to each derive control power from the driving member according to the extent of its set division and thus act to collectively effect speed driving relations between said members as separate and combined coincidental functions of the operation of the brake and the vehicle power supply control means.

9. A device for automatically and manually effecting and affecting speed driving relations between driving and driven power members of a vehicle equipped with a source of current and brake and fuel control mechanism, including drive sets each formed with an armature portion and each arranged in speed driving relation with one of the members and with each other, one set in driving relation with the other member, an initiating dynamo-electric machine control couple including a stationary field producing element and an armature element mounted for rotation with the driving member, said armature element of the control means forming a second field producing means when energized by the currents induced in the said armature element as same is rotated by the driving member, a plurality of exciter field current control circuit closers coincidently actuated as a function of the operation of the said brake and power control mechanisms of the vehicle whereby the speed driving relation of said members will be affected and effected as a function of the operation of the vehicle, a roller clutch mechanism positioned between the said members so as to be normally inactive, and roller clutch control means coincidently actuated by the said vehicle brake control mechanism for causing the said clutch mechanism to become operative as a unidirectional clutch.

10. A load controlled device for effecting speed drive relations between a pair of power members, comprising gear sets formed with an armature portion and collectively constituting a differential member axially positioned between said members, each set connected to one of the members and to adjacent sets, one set connected to the other member, a dynamo-electric load controlled organization including a stationary field producing means and an associated armature means mounted for rotation with one of the members, a second field producing means formed integral with the associated armature and energized by current induced in said associated armature, said second field means in dynamo-electric relation with the armatures of the said sets, a source of current, a manually actuated circuit closer for controlling the supply of current from the said source to said stationary field means, a second closer for controlling the supply of current to the said stationary field means when power is transmitted between the members in one axial direction, a third closer for controlling the said current supply when power is transmitted in the other axial direction, and a further control including a roller clutch mechanism between the members, said clutch normally inactive so as to become a unidirectional clutch when active.

11. A device for operatively associating driving and driven members of an automotive vehicle equipped with brake and fuel control mechanisms, constituting differential sets each formed with an armature portion and each connected to one of the members and to adjacent sets, one of the said sets connected to the other member, a variable speed dynamo-electric drive control means including a fixed field and an associated armature member mounted for rotation with one of the members, a plurality of separately positioned field current control means for controlling the drive control action of the said dynamo-electric means as a function of the operation of the brake and fuel control mechanism, said associated armature member of the control means forming a second field producing means when energized by the currents induced in said armature member as same is rotated by one of the members, said second named field member acting as a common field producing member for all the differential set armatures, a unidirectional roller clutch mechanism between the members, and manual control means to cause said unidirectional clutch to become bidirectional when required.

12. A combined manually, automatically and coincidently controlled variable speed dynamo-electric means for connecting a driving member of a vehicle equipped with fuel and brake control mechanisms to a driven member in variable speed drive relation, comprising axially disposed differential driving sets each formed with an armature portion and all connected to the driving member and to each adjacent set, a dynamo-electric machine couple including an armature element connected for rotation with the driving member and a stationary field flux producing member, a second field flux producing member mounted integral with the said couple armature and directly energized by current generated in said couple armature, a source of direct current, a plurality of couple field controls connected to said source and each including a variable resistance and a circuit closer, one of said controls including a manually settable closer for normal automatic operation of the armature element of the couple and associated dynamo-electric elements as a function of the drive resistance of the driven member, another of said controls operable as a function of the operation of the fuel supply of the said vehicle to cause the operation of the said couple and said associated elements as a function of the variable supply of fuel to the said vehicle and the drive resistance of the driven member, still another control including a roller clutch mechanism operable as a function of the operation of the braking mechanism of the said vehicle to cause the couple to act as a function of the load resistance of the driving member and the degree of braking action, said control also acting as a function of the load resistance of the normally driving member when driven and the degree of braking action.

13. The combination of vehicle driving and driven members, means including differential sets each formed with an armature portion and each in driving relation with one of the members and one of the sets, one set in driving relation with the other member, a dynamo-electric control couple, said coule including an armature portion connected to one of the members to receive control power therefrom to thereby control the said means, said armature portion of the control means forming a second field producing means when energized by the currents induced in said armature member as same is rotated by one of the members so as to dynamo-electrically associate same with the said set armatures, dynamo-electric field control means concurrently actuated as a function of the operation of the vehicle for initiating, disconnecting and maintaining the reception of control power by the said set armatures and for varying the said power reception.

14. A device for effecting and affecting variable speed drive relations between driving and driven power members of an automotive vehicle equipped with a source of electric current and braking and power supply control mechanisms, comprising differential drive sets each formed with an armature portion and each in driving relation with one of the members and with adjacent sets, one set in driving relation with the other member, a dynamo-electric machine control couple including an armature element mounted for rotation with the driving member and a stationary field producing member, a source of current, means constituting a plurality of circuit controls for selectively supplying current from the said source to the said control couple field member, said armature element of the control means forming a second field producing means when energized by the currents induced in said armature element as same is rotated by the said driving member, one of the said controls including a manually actuated circuit closer, a second field control including a variable resistance and a circuit closer actuated with the power supply control mechanism so as to co-act with the first named field control so as to affect and effect the said driving relations when the normally driven member is driving the normally driving member, said drive control armature element automatically affected by the load resistance of the driven member as it is additionally affected by one of the said field controls.

HOWARD J. MURRAY.